US006343686B1

(12) United States Patent
Whiting et al.

(10) Patent No.: US 6,343,686 B1
(45) Date of Patent: Feb. 5, 2002

(54) ROTATING CLAMP FOR CHANGING THE ORIENTATION OF A SUBSTRATE STACK

(75) Inventors: John F. Whiting, Webster; Kay E. Metcalf, Albion, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/568,242

(22) Filed: May 9, 2000

(51) Int. Cl.[7] ................................................ B65G 47/86
(52) U.S. Cl. ..................... 198/379; 271/185; 414/788.6
(58) Field of Search ................................ 198/379, 412, 198/413, 414, 416; 271/185; 414/788.3, 788.6

(56) References Cited

U.S. PATENT DOCUMENTS

| | | | | |
|---|---|---|---|---|
| 2,907,442 A | * 10/1959 | Monje | ........................ | 198/379 |
| 4,299,076 A | * 11/1981 | Humphrey | .............. | 198/412 X |
| 5,437,534 A | * 8/1995 | Gales | .................. | 414/788.6 X |
| 5,450,940 A | * 9/1995 | Rathert et al. | .............. | 198/412 |
| 5,469,954 A | * 11/1995 | Ruthert et al. | .......... | 198/379 X |
| 5,967,292 A | * 10/1999 | Corrales | ................. | 198/379 X |
| 6,042,105 A | * 3/2000 | Peulen | ................... | 271/185 X |

FOREIGN PATENT DOCUMENTS

| | | | |
|---|---|---|---|
| DE | 2747799 | * 5/1978 | .............. 414/788.6 |
| GB | 2080771 | * 2/1982 | ................. 271/185 |
| JP | 60-258037 | * 12/1985 | ................. 271/185 |

* cited by examiner

*Primary Examiner*—James R. Bidwell
(74) *Attorney, Agent, or Firm*—John M. Kelly; David E. Henn

(57) ABSTRACT

A low cost, high-speed device for rotating a variable thickness substrate stacks in a short distance, and with neatness and precision. The substrate stack rotating device includes a lower rotating disk and an upper rotating disk that are located in a substrate path to receive a moving substrate stack. The upper disk is driven downward such that a substrate stack is pinched between the lower and upper rotating disks. The resultant clamping force helps maintain substrate stack integrity and neatness. Once a substrate stack is clamped, one of the disks is rotated, bring the substrate stack into a desired orientation. The upper rotating disk is then released, the substrate stack beneficially moves away from the disks, and the substrate stack rotating device is ready to accept another substrate stack.

18 Claims, 6 Drawing Sheets

ROTATING CLAMP FOR CHANGING THE ORIENTATION OF A SUBSTRATE STACK

FIELD OF THE INVENTION

This invention relates generally to substrate handling systems. More particularly it concerns mechanically rotating a substrate stack passing through a document handler.

BACKGROUND OF THE INVENTION

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

Modern electrophotographic printers often include a finisher. In general, a finisher is a device that does something to substrates carrying a fused image. For example, a finisher might sort multiple copies of a given print job into multiple substrate stacks, add front and back covers to each stack, and then bind the individual substrate stacks together, possibly by stapling, into individual booklets. When used with high volume printers a finisher must quickly complete its task, without jeopardizing stack integrity, and while preserving stack neatness. Complicating finishing processes is a desire to keep the size of the printer as small as possible. A small finisher has only a short distance available to complete its operations. Another problem that complicates finishing is the wide variability of stack sizes. For example, a given substrate stack might consist of only a single, thin sheet of paper while another substrate stack might consist of dozens of relatively thick cardboard sheets.

While prior art finishers have been successful, their limitations have brought on a desire for improved performance. In particular, the need to rapidly rotate a substrate stack to achieve the required orientation for a given finisher operation has become apparent. For example, if a substrate stack could be rapidly rotated a given finisher function could operate on any side of the stack at high speed. For example, if a substrate stack could be rapidly rotated a fixed edge stapler could staple any side of the stack. Therefore, a substrate stack rotating device that is capable of rotating a substrate stack at high speed, in a short distance, with neatness and precision, that is capable of handling variable thickness stacks, and that is low cost would be beneficial.

SUMMARY OF THE INVENTION

The principles of the present invention provide for low cost, high-speed rotation of variable thickness substrate stacks in a short distance and with neatness and precision. A substrate stack rotating device according to the principles of the present invention includes a lower rotating disk and an upper rotating disk that are located in a substrate path to receive a moving substrate stack. The upper disk is driven downward such that a substrate stack is pinched between the lower and upper rotating disks. The resultant clamping force helps maintain substrate stack integrity and neatness. Once a substrate stack is clamped, one of the disks is rotated to bring the substrate stack into a desired orientation. The upper rotating disk is then released, the substrate stack beneficially moves away from the disks, and the substrate stack rotating device is ready to accept another substrate stack.

BRIEF DESCRIPTION OF THE DRAWINGS

Other aspects of the present invention will become apparent as the following description proceeds and upon reference to.

DETAILED DESCRIPTION OF A PREFERRED EMBODIMENT OF THE INVENTION

While the present invention will be described in connection with a preferred embodiment thereof, it will be understood that it is not intended to limit the invention to that embodiment. On the contrary, the present invention is intended to cover all alternatives, modifications, and equivalents as may be included within the spirit and scope of the invention as defined by the appended claims.

Figure 1:
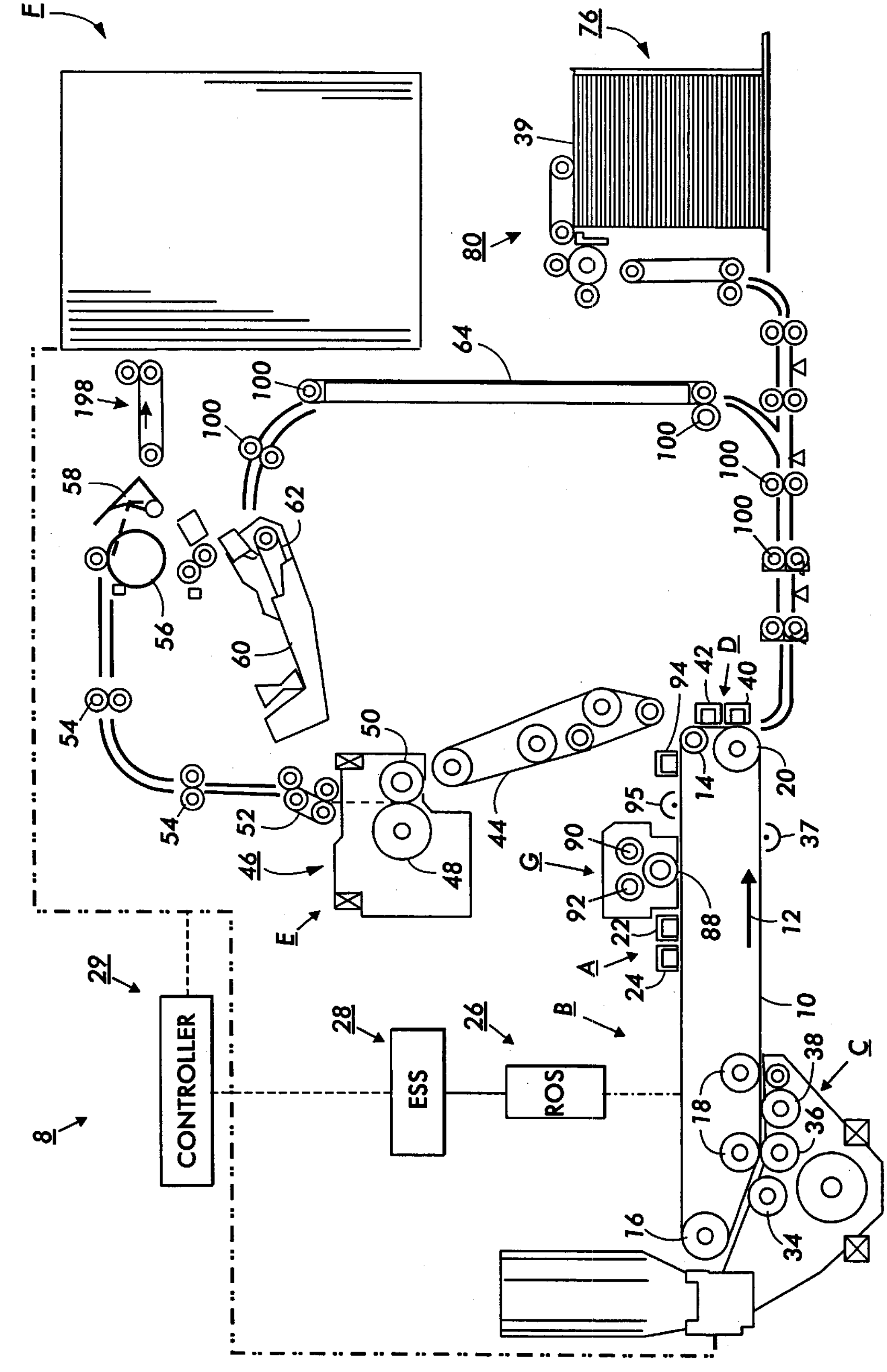
FIG. 1, a schematic view of an electrophotographic printing machine having a finisher that incorporates the principles of the present invention.

Referring now to FIG. 1, the preferred embodiment of the present invention beneficially finds use with an electrophotographic printing machine 8. However, it should be understood that the principles of the present invention will find use in a wide variety of machines. The electrophotographic printing machine employs a photoconductive belt 10. That belt 10 moves in a direction 12 to advance successive portions of the photoconductive belt sequentially through the various processing stations that are disposed about the belt's path. The photoconductive belt 10 is entrained about a stripping roller 14, a tensioning roller 16, idler rollers 18, and a drive roller 20. The tensioning roller 16 is urged against the photoconductive belt 10 so as to maintain that belt 10 under the desired tension. As the drive roller 20 rotates it advances the photoconductive belt 10 in the direction 12.

Initially, a portion of the photoconductive belt passes through a charging station A. There, two corona generating devices 22 and 24 charge the photoconductive belt 10 to a relatively high, substantially uniform potential. Next, the charged portion of the photoconductive belt advances through an imaging station B.

At imaging station B, a raster output scanner (ROS), indicated generally by the reference numeral 26, selectively discharges those portions of the charges photoconductive belt that correspond to a desired image that is to be produced. The result is an electrostatic latent image recorded on the photoconductive belt.

The desired image initially resides in a controller 29. That image might be from a stored bitmap, an input scanner, or from a data link, such as the Internet or a telecommunication link. The desired image is sent from the controller to an electronic subsystem (ESS) 28. The ESS 28 receives the desired images, performs any required signal processing, and converts the desired image into signals suitable for controlling the ROS 26. Of course other types of imaging systems, such as LED printbars, holography, or projection LCD (liquid crystal display) could also be used. The controller 29 not only sends the desired image to the input scanner, but also controls the overall operation of the electrophotographic printing machine 8.

After the electrostatic latent image is recorded on the photoconductive belt 10 that latent image advances to a development station C. The development station C has three magnetic brush developer rolls indicated generally by the reference numerals 34, 36 and 38. The photoconductive belt 10 partially wraps about rolls 34 and 36 to form extended development zones. The developer rolls 34 and 36 advance developer material onto the electrostatic latent image. That image attracts toner particles so as to form a toner powder image on the photoconductive belt 10. The developer roll 38 is used to remove any carrier granules that might adhere to belt.

To prepare for transfer a pretransfer erase lamp 37 discharges the toner powder image so as to reduce the toner charge levels. The toner power image then advances to a transfer station D. At transfer station D, a substrate 39, which has been moved into position from a substrate bin 76 via a substrate handling system 80, is brought into contact with the toner powder image. A corona generating device 40 sprays ions on the back of the substrate such that the substrate is tacked to photoconductive belt 10 and such that the toner powder image is attracted from the photoconductive belt to the substrate. After transfer, a corona generator 42 sprays opposite polity ions on the back of the substrate such that the substrate separates from the photoreceptor when the lip of the substrate passes over the roller 14. The substrate is then directed onto a conveyor 44, which advances the substrate to a fusing station E.

Fusing station E includes a fuser assembly indicated generally by the reference numeral 46 which permanently affixes the transferred toner powder image to the substrate. Preferably, the fuser assembly 46 includes a heated fuser roller 48 and a pressure roller 50 arranged such that the toner powder image on the substrate contacts the fuser roller 48. The pressure roller is cammed against the fuser roller to provide the necessary fusing pressure to fuse the toner powder image to the substrate.

After fusing, the substrate is fed through a decurler 52. The decurler 52 bends the substrate in one direction to put a known curl in the substrate and then bends it in the opposite direction to remove that curl. Forwarding rollers 54 then advance the substrate to a duplex turn roll 56. At the duplex turn roll a duplex solenoid gate 58 selectively guides the substrate either toward a finishing station F or into a duplex tray 60. The duplex tray 60 provides buffer storage for those substrates that have been printed on one side and on which an image will be subsequently printed on the opposite side, i.e., those substrates that are being duplex printed. The substrates are stacked in the duplex tray 60 face down on top of one another in the order in which they are being printed.

To complete the duplex printing, the substrates in the duplex tray 60 are fed, in seriatim, by a bottom feeder 62 from the duplex tray 60 back to the transfer station D via a transport 64 and rollers 100 for transfer of the toner powder image to the opposed sides of the copy sheets. After receiving another toner power image the substrates are once again feed through the fusing station 46 and to the duplex solenoid gate 58. During this pass the duplex printer substrates are advanced toward the finishing station F.

Advancement of the substrates toward the finishing station F is via a substrate transport 198. At finishing station F the substrates are either individually delivered to an output tray, or they are stacked in a compiler tray to form a substrate stack. The stacked substrates can be attached to one another by either a binder or a stapler. In either case, a plurality of sets of documents are formed in finishing station F. As the principles of the present invention most directly concerns the transport of the substrate stack through the finishing station F, that transport is described in more detail subsequently.

Invariably, after the substrate is separated from the photoconductive belt 10, some residual particles remain on that belt. Therefore, after transfer the photoconductive belt 10 passes beneath a corona generating device 94, which charges the residual toner particles to the proper polarity. Thereafter, the pre-charge erase lamp 95 discharges the photoconductive belt in preparation for the next charging cycle. Residual particles are removed from the photoconductive surface at cleaning station G. Cleaning station G includes an electrically biased cleaner brush 88 and two de-toning rolls, a reclaim roll 90 and a waste roll 92. The reclaim roll is electrically biased negatively relative to the cleaner brush so as to remove toner particles therefrom. The waste roll is electrically biased positively relative to the reclaim roll so as to remove paper debris and wrong sign toner particles. The toner particles on the reclaim and waster rolls are scraped off and deposited in a reclaim auger (not shown), where it is transported out of the rear of cleaning station G.

As previously mentioned, the various machine functions are controlled by the controller 29. The controller 29 is preferably a programmable microprocessor that operates according to a stored software program.

Figure 2:
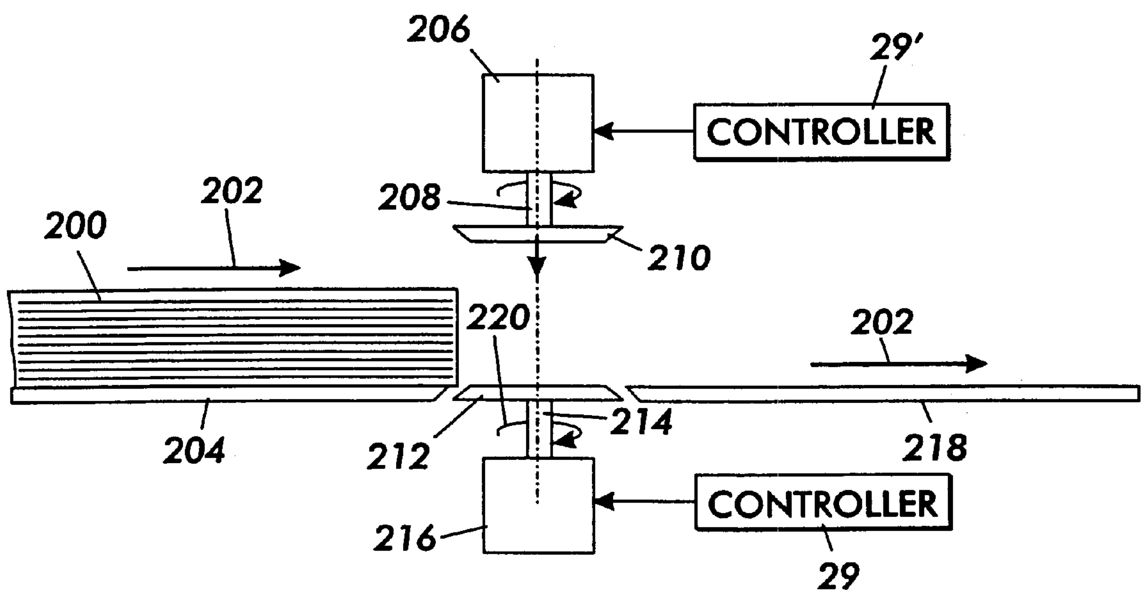
FIG. 2, a schematic of a stack rotation device according to the principles of the present invention.

FIG. 2 provides a simplified side view of a substrate stack rotation assembly within the finishing station F. That assembly selectively and controllably rotates a substrate stack 200 to a predetermined orientation. As shown, the substrate stack 200 is transported in a direction 202 by a transport belt 204. When the substrate stack reaches the proper position, described in more detail below, a solenoid 206 actuates, thereby forcing solenoid armature 208 downward. At the distal end of the solenoid armature is an upper disk 210, which is free to rotate on the solenoid armature. Below both the upper disk 210 and the substrate stack 200 is a lower disk 212. The lower disk 212 is mounted on the end of an armature 214 of a motor 216. Also shown in FIG. 2 is a receiving belt 218 that also moves in the direction 202.

In operation, the substrate stack 200 advances until at least part of it is located between the upper disk 210 and the lower disk 212. At that time the controller 29 causes the solenoid 206 to actuate. This drives the upper disk toward the lower disk, clamping the substrate stack between the disks. The controller 29 then causes the motor 216 to drive in the direction 220, bringing the substrate stack to the desired orientation. The solenoid 206 is then de-activated, which causes the upper disk to move away from the lower disk. The substrate stack then advances onto a receiving belt 218. The substrate stack rotation assembly is then ready to accept the next substrate stack.

Figure 3:
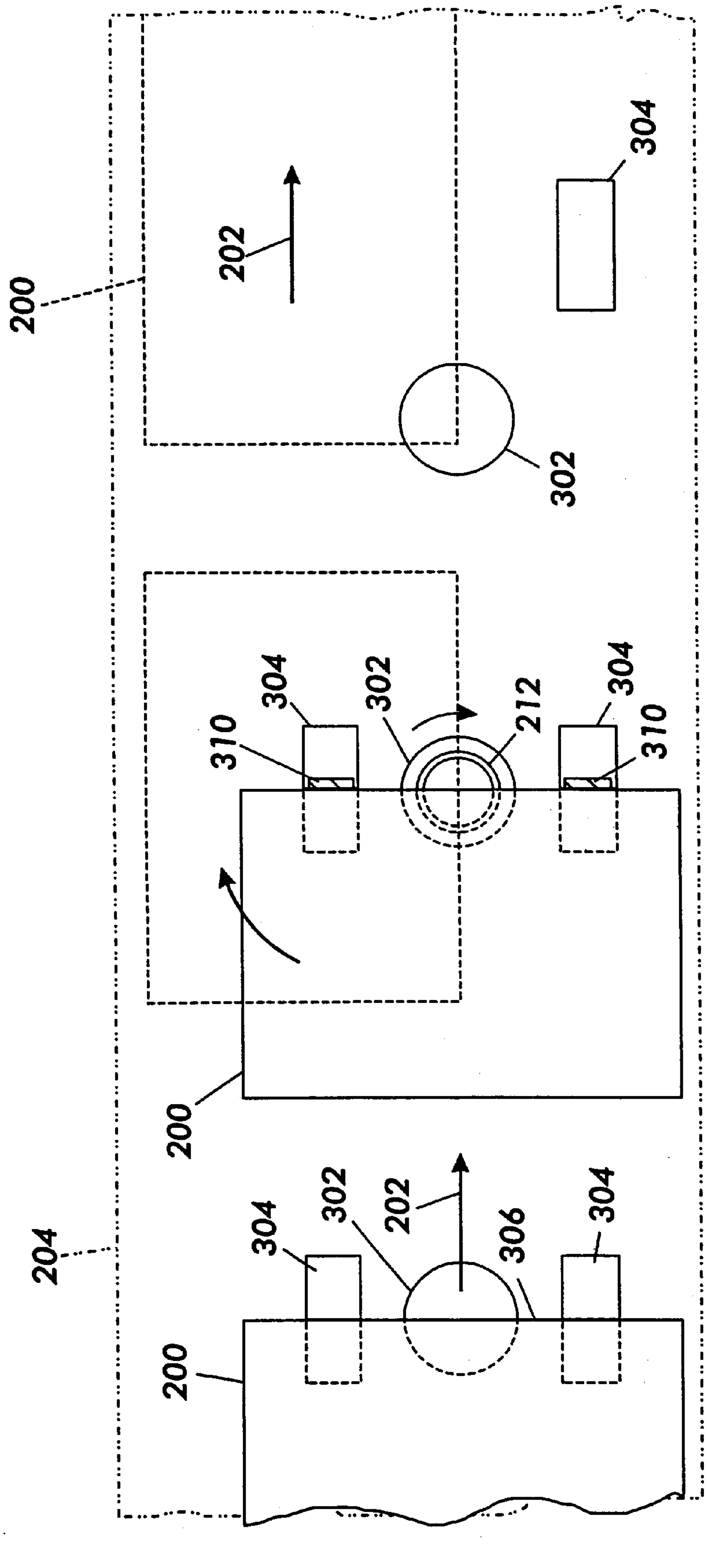
FIG. 3, a schematic view showing the stack rotation device of FIG. 2 located and operated so as to contact the middle of the leading edge of a substrate stack.

The location of the substrate rotation assembly relative to the substrate stack during rotation can be critical. This is particularly true when the substrate rotation assembly further includes registration fingers. FIG. 3 illustrates a top-down view of such a system. As shown, the substrate stack 200 advances in the direction 202 on the transport belt 204. The transport belt 204 further includes a plurality of disk openings 302 and registration finger openings 304. In the system shown in FIG. 3 the transport belt 204 is also the receiving belt 218. In operation, the substrate stacks are located on the transport belt 204 such that leading edge 306 is centered over a disk opening 302. At that time registration fingers 310 are inserted through the registration finger openings 304 such that the leading edge of a substrate stack contacts those fingers. This improves the neatness of the substrate stack. Then, the upper disk is driven toward the lower disk, the registration fingers are removed, and the substrate stack is rotated as described above and as shown in dashed lines in FIG. 3.

Figure 4:
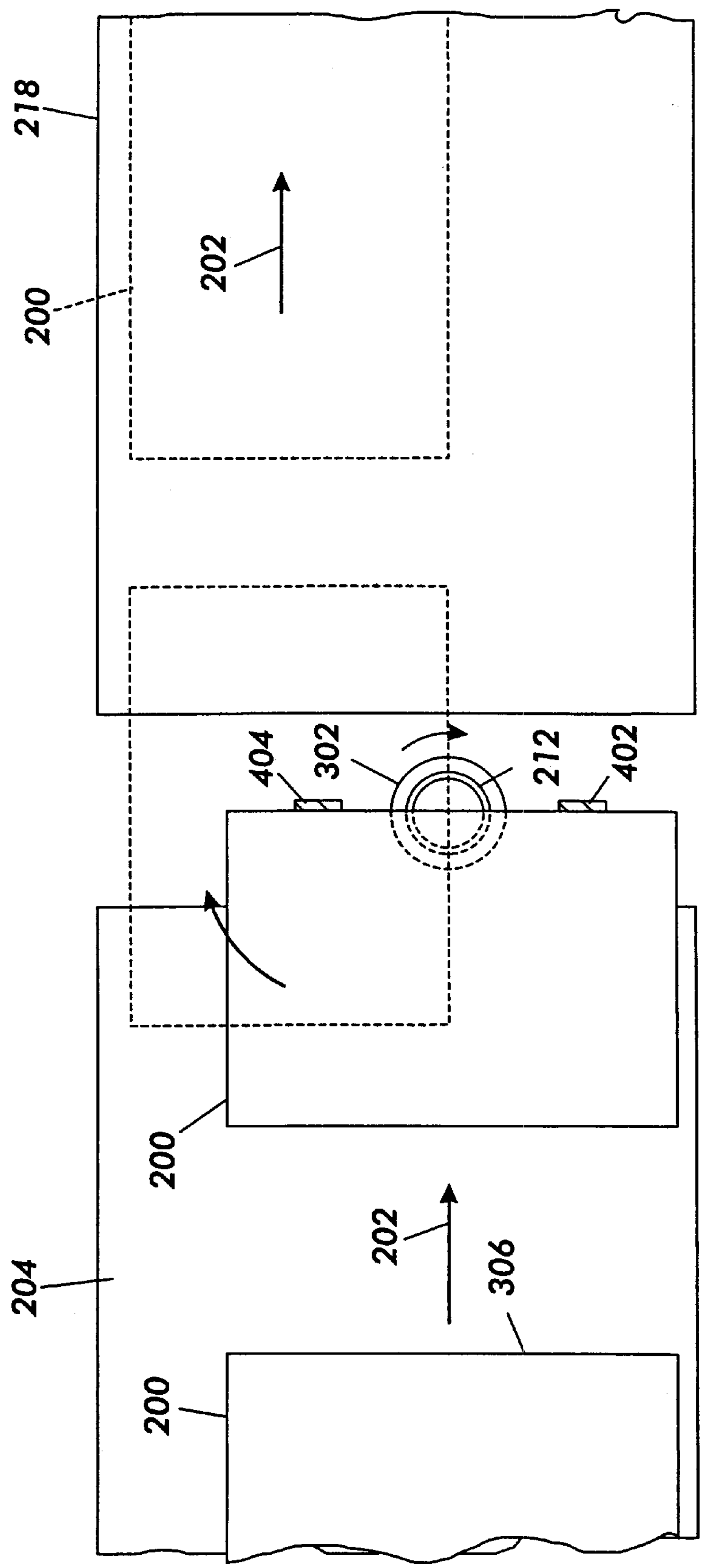
FIG. 4, a schematic view showing another stack rotation device according to FIG. 2 located and operated so as to contact the middle portion of the leading edge of a substrate stack.

An alternative version of the "center, leading edge" substrate rotation assembly is shown in FIG. 4. This system does not require disk openings 302 and registration finger openings 304, but rather uses two separate transport belts, the transport belt 204 and the receiving belt 218, which are separated by the substrate rotation assembly. That assembly includes a fixed registration finger 402 and a movable registration finger 404. In operation a substrate stack on the transport belt 204 advances toward the substrate rotation assembly. The movable registration finger 404 is located to contact the leading edge 306 of a substrate stack. Together with the fixed registration finger 402 the movable registration finger improves the neatness of the substrate stack. Then, the upper disk (not shown in FIG. 4) is driven toward the lower disk 212, the movable registration finger is moved out of the way and the substrate stack 200 is rotated as described above. The rotated substrate stack ends up on the receiving belt 218, with the end result being a substrate stack orientated as shown in dashed lines in FIG. 4.

An advantage of the substrate rotation assemblies shown in FIGS. 3 and 4 is that they do not require an increase in the substrate path width. A further advantage of the substrate rotation assembly illustrated in FIG. 4 is that only one movable registration finger is required.

Figure 5:
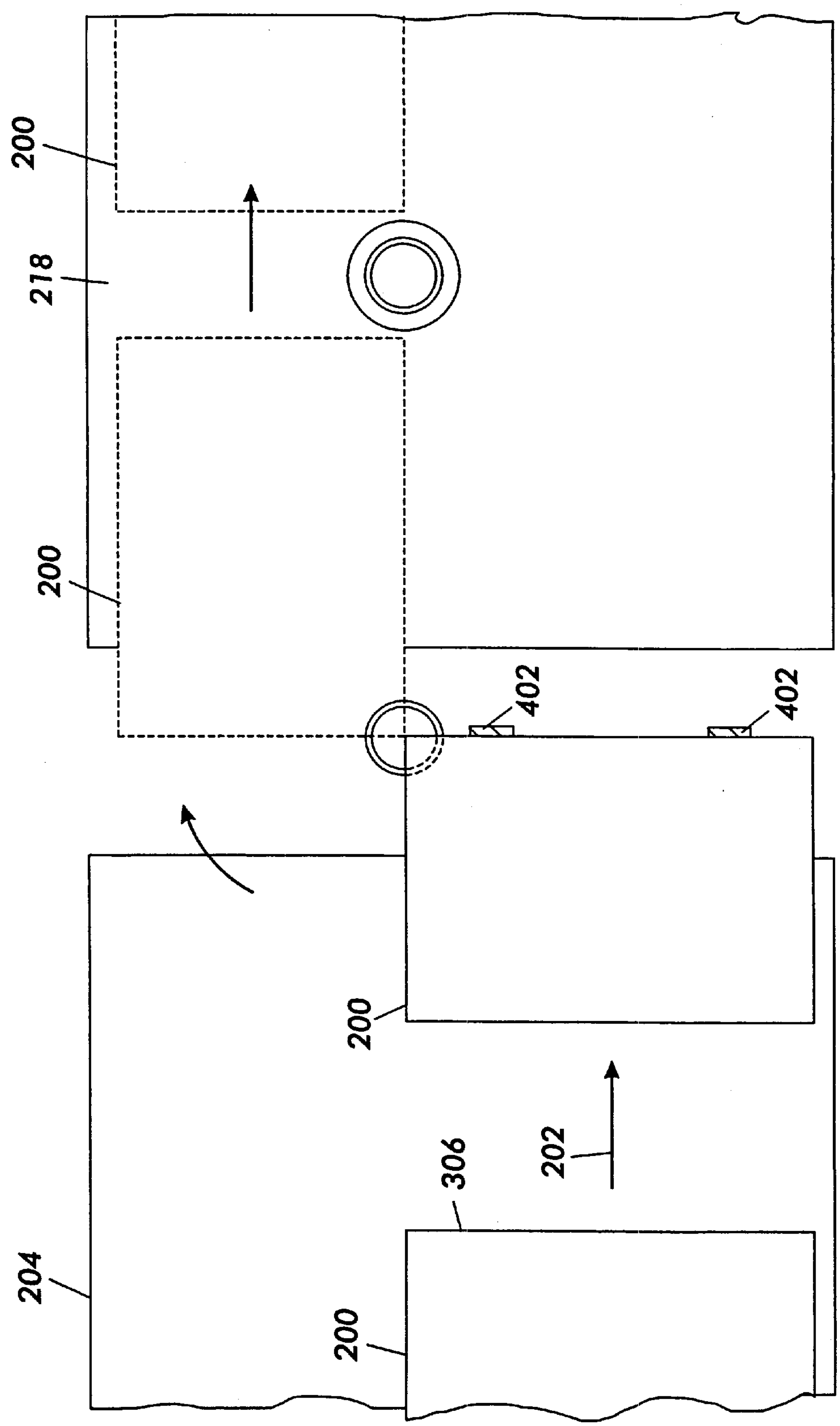
FIG. 5, a schematic view showing the stack rotation device of FIG. 2 located and operated so as to contact a comer of the leading edge comer of a substrate stack.

An alternative location of the substrate rotation assembly relative to the substrate stack 200 is illustrated in FIG. 5. As shown, the substrate rotation assembly is located adjacent a corner of the leading edge 306 of the substrate stack. As the substrate stack 200 advances in the direction 202 on the transport belt 204 the leading edge 306 of the substrate stack comes into contract with two fixed registration fingers 402. Then, the upper disk is driven toward the lower disk, clamping the substrate stack at one corner of the leading edge. The substrate stack is then rotated to the orientated shown in dashed lines in FIG. 5. The rotated substrate stack ends up on the receiving belt 218. The upper clamp then moves up, releasing the substrate stack. Advantages of the substrate rotation assembly shown in FIG. 5 are no increase in the substrate path width and only fixed registration fingers are needed. However, the substrate path width is relatively wide.

Figure 6:
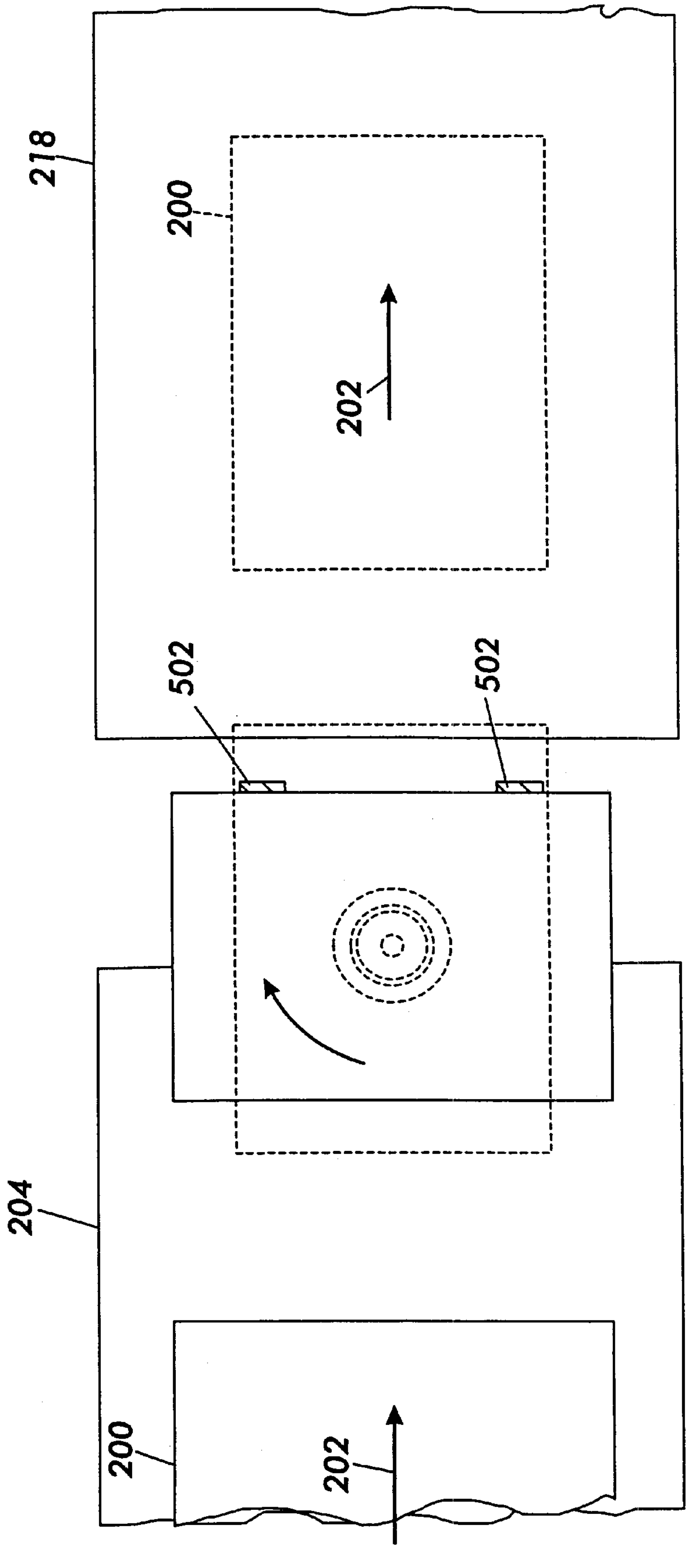
FIG. 6, a schematic view showing the stack rotation device of FIG. 2 located and operated so as to contact the center of a substrate stack.

If a narrow substrate path is important, locating the substrate rotation assembly relative to the substrate stack as illustrated in FIG. 6 may be beneficial. As shown, the substrate rotation assembly is located at the center of the substrate path formed by the transport belt 204 and the receiving belt 218. As the substrate stack 200 advances in the direction 202 on the transport belt 204 the center of the leading edge 306 of the substrate stack passes over the region between the upper and lower disks. The leading edge eventually comes into contract with two movable registration fingers 502. Then, the upper disk is driven toward the lower disk, clamping the substrate stack at its center. The movable registration fingers 502 are then moved away from the substrate stack, that stack is then rotated to the orientated shown in dashed lines in FIG. 6, and the upper clamp then moves up, releasing the substrate stack. While locating the substrate rotation assembly as shown in FIG. 6 results in a relatively narrow substrate path, two movable registration fingers are required.

While this invention has been described in conjunction with specific embodiments, it is evident that many alternatives, modifications, and variations will be apparent to those skilled in the art. Accordingly, the present invention is intended to embrace all alternatives, modifications and variations that fall within the spirit and broad scope of the appended claims.

We claim:

1. A substrate stack rotating assembly, comprising:

a substrate mover for moving a substrate stack along a substrate path such that said substrate stack has a leading edge;

a lower rotating disk disposed in said substrate path;

an upper rotating disk disposed above said lower rotating disk;

said a lower rotating disk and said upper rotating disk being located at a corner of said leading edge;

a driver for moving said upper rotating disk toward said lower rotating disk such that a substrate stack in said substrate path is pinched between said lower rotating disk and said upper rotating disk such that a resulting clamping force exists between said lower rotating disk and said upper rotating disk; and a rotator for rotating a substrate stack into a desired orientation.

2. A substrate stack rotating assembly according to claim 1, wherein said substrate mover is a transport belt.

3. A substrate stack rotating assembly according to claim 1, wherein said driver is a solenoid.

4. A substrate stack rotating assembly according to claim 1, wherein said rotator is a motor.

5. A substrate stack rotating assembly according to claim 1, further including a controller for controlling the operation of said driver and said rotator.

6. A substrate stack rotating assembly according to claim 1, further including a receiving belt for receiving said substrate stack after said substrate stack is rotated into a desired orientation.

7. A substrate stack rotating assembly according to claim 1, wherein said a lower rotating disk and said upper rotating disk are located substantially in the center of said leading edge.

8. A substrate stack rotating assembly according to claim 1, further including a fixed finger for contacting said substrate stack as said substrate stack moves along said substrate path.

9. A substrate stack rotating assembly according to claim 1, further including a movable finger for contacting said substrate stack as said substrate stack moves along said substrate path.

10. An electrophotographic marking machine having a substrate handler, said substrate handler including:

a substrate mover for moving a substrate stack along a substrate path such that said substrate stack has a leading edge;

a lower rotating disk disposed in said substrate path;

an upper rotating disk disposed above said lower rotating disk;

said a lower rotating disk and said upper rotating disk being located at a corner of said leading edge;

a driver for moving said upper rotating disk toward said lower rotating disk such that a substrate stack in said substrate path is pinched between said lower rotating disk and said upper rotating disk such that a resulting clamping force exists between said lower rotating disk and said upper rotating disk; and a rotator for rotating a substrate stack into a desired orientation.

11. An electrophotographic marking machine according to claim 10, further including a fixed finger for contacting said substrate stack as said substrate stack moves along said substrate path.

12. An electrophotographic marking machine according to claim 10, wherein said substrate mover is a transport belt.

13. An electrophotographic marking machine according to claim 10, wherein said driver is a solenoid.

14. An electrophotographic marking machine according to claim 10, wherein said rotator is a motor.

15. An electrophotographic marking machine according to claim 10, further including a controller for controlling the operation of said driver and said rotator.

16. A substrate stack rotating device according to claim 10, further including a receiving belt for receiving said substrate stack after said substrate stack is rotated into a desired orientation.

17. An electrophotographic marking machine according to claim 10, wherein said a lower rotating disk and said upper rotating disk are located substantially in the center of said leading edge.

18. An electrophotographic marking machine according to claim 10, further including a movable finger for contacting said substrate stack as said substrate stack moves along said substrate path.

* * * * *